United States Patent [19]
Mc Grue

[11] Patent Number: 5,975,614
[45] Date of Patent: Nov. 2, 1999

[54] CANOPY ATTACHMENT

[76] Inventor: Donna M. Mc Grue, 17350 E. Temple Ave., Space 460, La Puente, Calif. 91744

[21] Appl. No.: 09/082,685

[22] Filed: May 21, 1998

[51] Int. Cl.[6] ........................................... B62J 17/08
[52] U.S. Cl. .......................................... 296/78.1; 296/102
[58] Field of Search ................................. 296/78.1, 102

[56] References Cited

U.S. PATENT DOCUMENTS

| | | | |
|---|---|---|---|
| 485,610 | 11/1892 | Cool | 296/102 |
| 1,342,987 | 6/1920 | Chimino | 296/78.1 |
| 2,539,951 | 1/1951 | Hall | 296/102 |
| 3,256,034 | 6/1966 | Condray | 296/102 |
| 4,037,614 | 7/1977 | Hines et al. | 296/102 |
| 4,045,077 | 8/1977 | DeVone | 296/78.1 |
| 4,778,214 | 10/1988 | Fu | 296/102 |

*Primary Examiner*—Gary C. Hoge

[57] ABSTRACT

A new canopy attachment for mounting to a bicycle. The inventive device includes a canopy and a pair of side frames. Each side frame comprises an elongate cross bar and a pair of elongate legs. For each side frame, the upper end of one of the legs is pivotally coupled to one of the ends of the cross bar of the side frame and the upper end of another of the legs is pivotally coupled to another end of the cross bar of the side frame. The lower ends of legs of each side frame are adapted for attachment to a frame of a bicycle. The cross bar of one of the side frames is detachably coupled to one of the sides of the canopy while the cross bar of another of the side frames is detachably coupled to another of the sides of the canopy.

17 Claims, 3 Drawing Sheets

CANOPY ATTACHMENT

BACKGROUND OF THE INVENTION

1. Field of the Invention

The present invention relates to bicycle accessories and more particularly pertains to a new canopy attachment for mounting to a bicycle.

2. Description of the Prior Art

The use of bicycle accessories is known in the prior art. More specifically, bicycle accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle accessories include U.S. Pat. No. 4,045,077; U.S. Pat. No. 4,560,196; U.S. Pat. No. 3,284,130; U.S. Pat. No. 5,072,987; U.S. Pat. No. 1,357,239; and U.S. Pat. No. Des. 355,403.

While these devices fulfill their respective, particular objectives and requirements, the aforementioned patents do not disclose a new canopy attachment. The inventive device includes a canopy and a pair of side frames. Each side frame comprises an elongate cross bar and a pair of elongate legs. For each side frame, the upper end of one of the legs is pivotally coupled to one of the ends of the cross bar of the side frame and the upper end of another of the legs is pivotally coupled to another end of the cross bar of the side frame. The lower ends of legs of each side frame are adapted for attachment to a frame of a bicycle. The cross bar of one of the side frames is detachably coupled to one of the sides of the canopy while the cross bar of another of the side frames is detachably coupled to another of the sides of the canopy.

In these respects, the canopy attachment according to the present invention substantially departs from the conventional concepts and designs of the prior art, and in so doing provides an apparatus primarily developed for the purpose of mounting to a bicycle.

SUMMARY OF THE INVENTION

In view of the foregoing disadvantages inherent in the known types of bicycle accessories now present in the prior art, the present invention provides a new canopy attachment construction wherein the same can be utilized for mounting to a bicycle.

The general purpose of the present invention, which will be described subsequently in greater detail, is to provide a new canopy attachment apparatus and method which has many of the advantages of the bicycle accessories mentioned heretofore and many novel features that result in a new canopy attachment which is not anticipated, rendered obvious, suggested, or even implied by any of the prior art bicycle accessories, either alone or in any combination thereof.

To attain this, the present invention generally comprises a canopy and a pair of side frames. Each side frame comprises an elongate cross bar and a pair of elongate legs. For each side frame, the upper end of one of the legs is pivotally coupled to one of the ends of the cross bar of the side frame and the upper end of another of the legs is pivotally coupled to another end of the cross bar of the side frame. The lower ends of legs of each side frame are adapted for attachment to a frame of a bicycle. The cross bar of one of the side frames is detachably coupled to one of the sides of the canopy while the cross bar of another of the side frames is detachably coupled to another of the sides of the canopy.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new canopy attachment apparatus and method which has many of the advantages of the bicycle accessories mentioned heretofore and many novel features that result in a new canopy attachment which is not anticipated, rendered obvious, suggested, or even implied by any of the prior art bicycle accessories, either alone or in any combination thereof.

It is another object of the present invention to provide a new canopy attachment which may be easily and efficiently manufactured and marketed.

It is a further object of the present invention to provide a new canopy attachment which is of a durable and reliable construction.

An even further object of the present invention is to provide a new canopy attachment which is susceptible of a low cost of manufacture with regard to both materials and labor, and which accordingly is then susceptible of low prices of sale to the consuming public, thereby making such canopy attachment economically available to the buying public.

Still yet another object of the present invention is to provide a new canopy attachment which provides in the apparatuses and methods of the prior art some of the advantages thereof, while simultaneously overcoming some of the disadvantages normally associated therewith.

Still another object of the present invention is to provide a new canopy attachment for mounting to a bicycle.

Yet another object of the present invention is to provide a new canopy attachment which includes a canopy and a pair of side frames. Each side frame comprises an elongate cross bar and a pair of elongate legs. For each side frame, the upper end of one of the legs is pivotally coupled to one of the ends of the cross bar of the side frame and the upper end of another of the legs is pivotally coupled to another end of the cross bar of the side frame. The lower ends of legs of each side frame are adapted for attachment to a frame of a bicycle. The cross bar of one of the side frames is detachably coupled to one of the sides of the canopy while the cross bar of another of the side frames is detachably coupled to another of the sides of the canopy.

Still yet another object of the present invention is to provide a new canopy attachment that shades a user from the sun while riding a bicycle.

Even still another object of the present invention is to provide a new canopy attachment that protects a user from exposure to harmful ultraviolet radiation from the sun while riding a bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
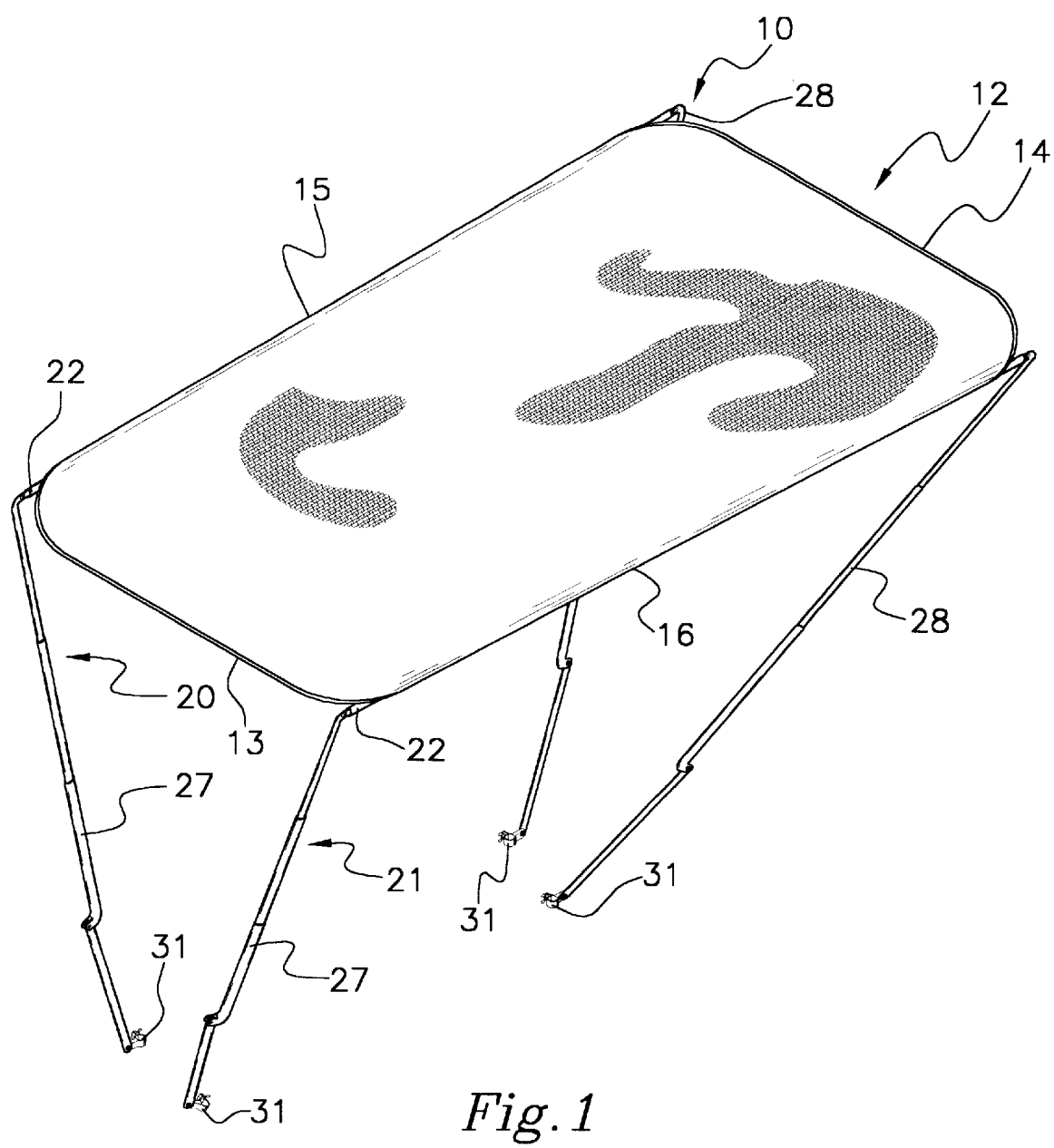
FIG. 1 is a schematic perspective view of a new canopy attachment according to the present invention.
Figure 2:
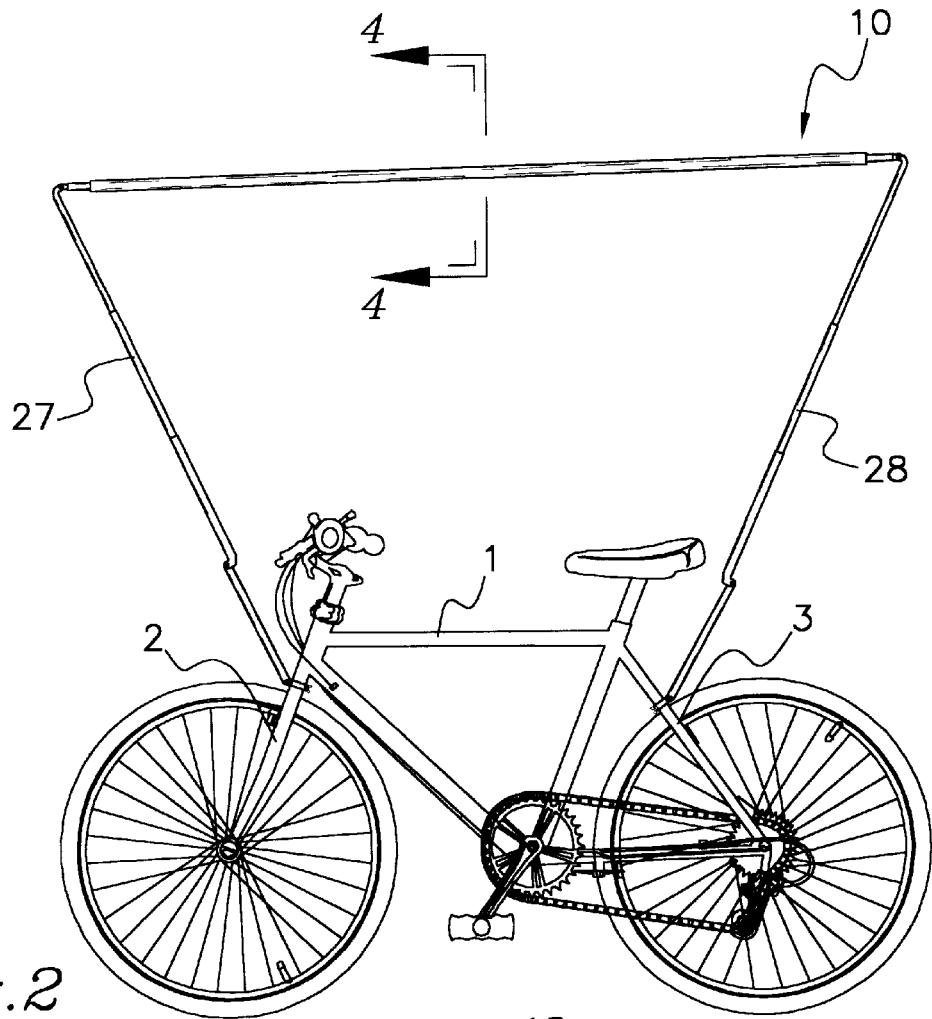
FIG. 2 is a schematic side view of the present invention in use attached to a bicycle.
Figure 3:
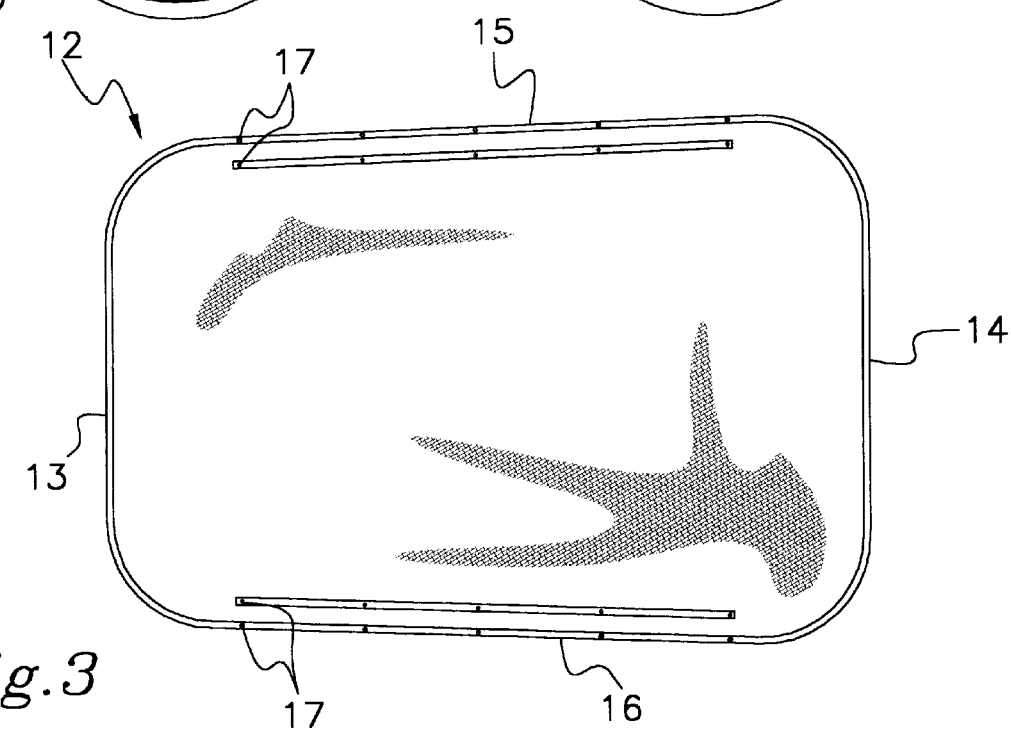
FIG. 3 is a schematic side view of the canopy of the present invention.

With reference now to the drawings, and in particular to FIGS. 1 through 6 thereof, a new canopy attachment embodying the principles and concepts of the present invention and generally designated by the reference numeral 10 will be described.

In use, the attachment 10 is designed for attachment to the front forks 2 and rear seat stays 3 of a bicycle 1 to shade a rider of the bicycle from sunlight. As best illustrated in FIGS. 1 through 6, the canopy attachment 10 generally comprises a canopy 12 and a pair of side frames 20,21. Each side frame comprises an elongate cross bar 22 and a pair of elongate legs 27,28. For each side frame, the upper end of one of the legs 27 is pivotally coupled to one of the ends of the cross bar 22 of the side frame and the upper end of another of the legs 28 is pivotally coupled to another end of the cross bar 22 of the side frame. The lower ends of legs 27,28 of each side frame are adapted for attachment to a frame of a bicycle 1. The cross bar of one of the side frames 20 is detachably coupled to one of the sides 15 of the canopy 12 while the cross bar of another of the side frames 21 is detachably coupled to another of the sides 16 of the canopy 12.

In closer detail, the canopy 12 of the attachment 10 is generally rectangular and has first and second ends 13,14 and a pair of sides 15,16 extending between the ends of the canopy 12. Preferably, the canopy 12 comprises a flexible fabric material. Ideally, the sides 15,16 of the canopy 12 converging towards each other towards the first end 13 of the canopy 12.

Each of the side frames 20,21 comprises an elongate cross bar 22 and a pair of elongate legs 27,28. Ideally, the cross bar 22 and the legs 27,28 comprise elongate tubes such as aluminum tubing. The cross bar 22 of the side frame has a pair of opposite ends and preferably a pair of detachable portions 23,24. The detachable portions 23,24 of the cross bar 22 each have a telescopically retractable end regions 25,26 so that the end region 25 of one of the detachable portions 23 is insertable into the end region 26 of the other detachable portion 24.

Each of the legs 27,28 of the side frame has upper and lower ends. The upper end of one of the legs 27 is pivotally coupled to one of the ends of the cross bar 22 of the side frame while the upper end of another of the legs 28 is pivotally coupled to another end of the cross bar 22 of the side frame. The lower ends of legs 27,28 of the side frame are adapted for attachment to a frame of a bicycle 1 preferably to the front forks 2 and rear seat stays 3 of the frame 1. Ideally, the lower end of each of the legs 27,28 of the side frame has a clamp 31 for attaching the lower end of the associated leg to a portion of the frame of a bicycle 1.

Preferably, each of the legs 27,28 of the side frame also has elongate upper and lower portions 29,30. The upper portion 29 of the leg is telescopically extendible while the lower portion 30 of the leg is pivotally coupled to the upper portion 29 of the leg. Ideally, the upper portion 29 has three telescopic sub-portions with the lengths of the sub-portions ideally generally equal to one another. Also ideally, the lengths of the sub-portions are generally equal to the length of the lower portion 30.

The cross bar 22 of one of the side frames 20 is detachably coupled to one of the sides 15 of the canopy 12 with the cross bar of another of the side frames 21 detachably coupled to another of the sides 16 of the canopy 12. Preferably, the length of each side 15,16 of the canopy 12 is generally parallel with the length of the cross bar of the associated side frame 20,21. Ideally, the canopy is attached to the side frames so that one of the ends of the canopy 12 is positioned adjacent one of the ends of each of the cross bar of the side frames 20,21 and the other end of the canopy 12 is positioned adjacent the other end of each cross bar of each of the side frames 20,21.

Figure 4:
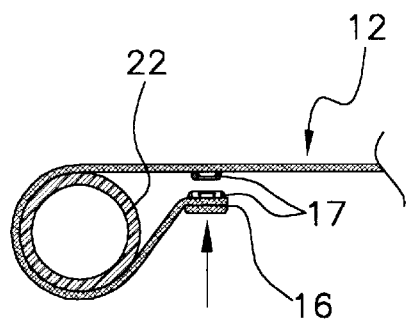
FIG. 4 is a schematic sectional view of the attachment of a cross bar of a side frame to a side of the canopy of the present invention taken from line 4—4 of FIG. 2.

With reference to FIG. 4, in an ideal embodiment, each side 15,16 of the canopy 12 is looped around the cross bar 22 of the associated side frame to attach the cross bar 22 to the associated side of the canopy 12. A plurality of fasteners 17 detachably attach each of the sides 15,16 of the canopy 12 looped around the cross bar 22 of the associated side frame to an adjacent portion of the canopy 12. Ideally, the fasteners 17 comprise snaps.

In an illustrative embodiment, the canopy 12 has a length defined between the ends of the canopy 12 greater than about 4 feet, a width defined between the sides 15,16 of the canopy 12 greater than about 3 feet. Ideally, the length is about 5 feet and the width is about 4 feet. Preferably, the legs 27,28 of the side frames 20,21 are extendible to a length of at least about 4 feet.

Figure 5:
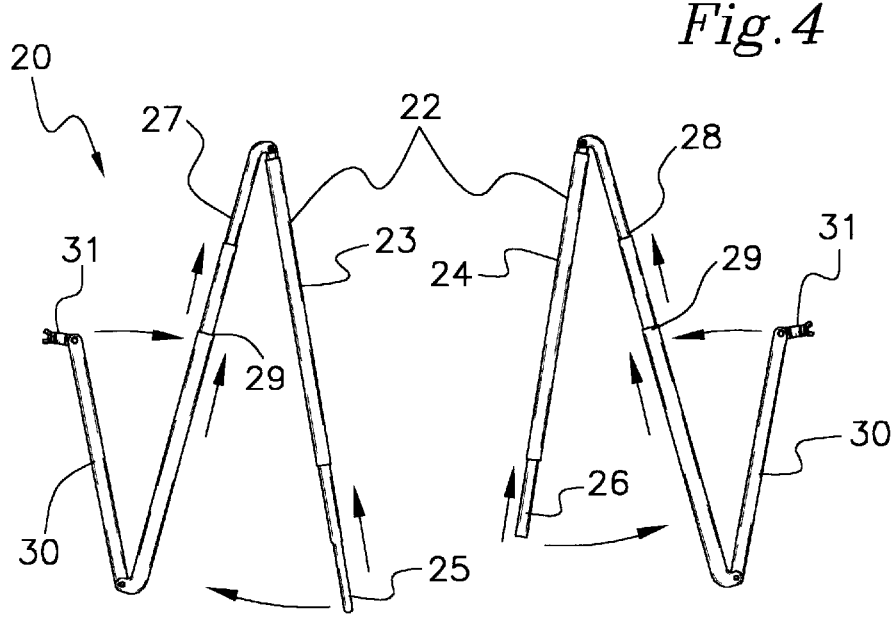
FIG. 5 is a schematic side view of the present invention illustrating the collapsing of a side frame for convenient storage when not in use.
Figure 6:
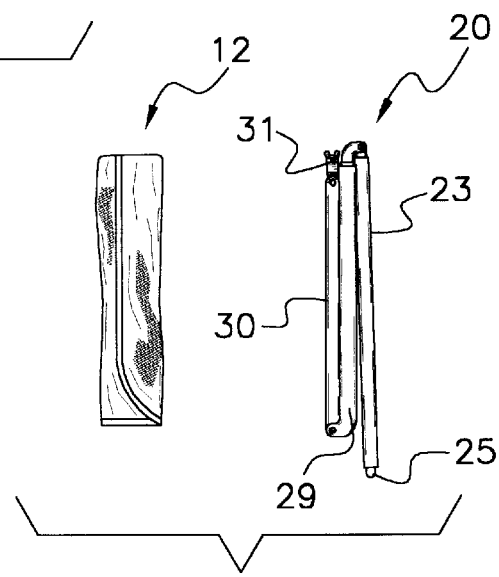
FIG. 6 a schematic side view of the present invention collapsed and folded from storage.

In use, the lower ends of the legs are attached to the front forks and rear seat stays of a bicycle frame so that the canopy is suspended over the bike preferably with the ends of the canopy outwardly extending over the bike so that a large proportion of a rider on the bike is shaded from the sun. As illustrated in FIGS. 5 and 6, the side frames are collapsible for convenient storage when not in use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An attachment for attachment to the front forks and rear seat stays of a bicycle, said attachment comprising:

a canopy having first and second ends and a pair of sides extending between said ends of said canopy;

a pair of side frames, wherein each side frame comprises an elongate cross bar and a pair of elongate legs;

said cross bar of said side frame having a pair of opposite ends;

each of said legs of said side frame having upper and lower ends, the upper end of one of said legs being pivotally coupled to one of said ends of said cross bar of said side frame, the upper end of another of said legs being pivotally coupled to another end of said cross bar of said side frame; and said lower ends of legs of said side frame being adapted for attachment to a frame of a bicycle;

the cross bar of one of said side frames being detachably coupled to one of said sides of said canopy, the cross bar of another of said side frames being detachably coupled to another of said sides of said canopy; and wherein each of said legs of each of said side frames has elongate upper and lower portions, the upper portion of the leg being telescopically extendible, the lower portion of the leg being pivotally coupled to said upper portion of the leg.

2. The attachment of claim 1, wherein said canopy comprises a flexible fabric material.

3. The attachment of claim 1, wherein said sides of said canopy converge towards each other towards said first end of said canopy.

4. The attachment of claim 1, wherein said cross bar of each of said side frames has a pair of detachable portions.

5. The attachment of claim 1, wherein the lower end of each of said legs of each of said side frames has a clamp for attaching the lower end of the leg to a portion of a side frame of a bicycle.

6. The attachment of claim 1, wherein each of said cross bars of said side frames has a length, wherein said sides of said canopy each have a length, wherein said length of each side of said canopy is generally parallel with the length of the cross bar of the associated side frame.

7. The attachment of claim 1, wherein one of said ends of said canopy is positioned adjacent one of said ends of each of said cross bars of said side frames, wherein another of said ends of said canopy is positioned adjacent another of said ends of each of said cross bars of said side frames.

8. The attachment of claim 1, wherein each of said sides of said canopy are looped around the cross bar of the associated side frame to attach the cross bar to the associated side of said canopy, wherein a plurality of fasteners detachably attach each of said sides of said canopy looped around the cross bar of the associated side frame to an adjacent portion of said canopy.

9. An attachment for attachment to the front forks and rear seat stays of a bicycle, said attachment comprising:

a canopy being generally rectangular and having first and second ends and a pair of sides extending between said ends of said canopy, said canopy comprising a flexible fabric material;

said sides of said canopy converging towards each other towards said first end of said canopy;

a pair of side frames, wherein each side frame comprises an elongate cross bar and a pair of elongate legs;

said cross bar of said side frame having a pair of opposite ends and a pair of detachable portions;

each of said legs of said side frame having upper and lower ends, the upper end of one of said legs being pivotally coupled to one of said ends of said cross bar of said side frame, the upper end of another of said legs being pivotally coupled to another end of said cross bar of said side frame;

said lower ends of legs of said side frame being adapted for attachment to a side frame of a bicycle, wherein the lower end of each of said legs of said side frame has a clamp for attaching the lower end of the leg to a portion of a side frame of a bicycle; and each of said legs of said side frame having elongate upper and lower portions, the upper portion of the leg being telescopically extendible, the lower portion of the leg being pivotally coupled to said upper portion of the leg; and the cross bar of one of said side frames being detachably coupled to one of said sides of said canopy, the cross bar of another of said side frames being detachably coupled to another of said sides of said canopy;

wherein each of said cross bars of said side frames has a length, wherein said sides of said canopy each have a length, wherein said length of each side of said canopy is generally parallel with the length of the cross bar of the associated side frame;

wherein one of said ends of said canopy is positioned adjacent one of said ends of each of said cross bars of said side frames, wherein another of said ends of said canopy is positioned adjacent another of said ends of each of said cross bars of said side frames; and wherein each of said sides of said canopy are looped around the cross bar of the associated side frame to attach the cross bar to the associated side of said canopy, wherein a plurality of fasteners detachably attach each of said sides of said canopy looped around the cross bar of the associated side frame to an adjacent portion of said canopy, wherein said fasteners comprise snaps.

10. An attachment for attachment to the front forks and rear seat stays of a bicycle, said attachment comprising:

a canopy having first and second ends and a pair of sides extending between said ends of said canopy;

a pair of side frames, wherein each side frame comprises an elongate cross bar and a pair of elongate legs;

said cross bar of said side frame having a pair of opposite ends;

each of said legs of said side frame having upper and lower ends, the upper end of one of said legs being pivotally coupled to one of said ends of said cross bar of said side frame, the upper end of another of said legs being pivotally coupled to another end of said cross bar of said side frame; and said lower ends of legs of said side frame being adapted for attachment to a frame of a bicycle;

the cross bar of one of said side frames being detachably coupled to one of said sides of said canopy, the cross bar of another of said side frames being detachably coupled to another of said sides of said canopy; and wherein said sides of said canopy converge towards each other towards said first end of said canopy.

11. The attachment of claim 10, wherein said canopy comprises a flexible fabric material.

12. The attachment of claim 10, wherein said cross bar of each of said side frames has a pair of detachable portions.

13. The attachment of claim 10, wherein the lower end of each of said legs of each of said side frames has a clamp for attaching the lower end of the leg to a portion of a side frame of a bicycle.

14. The attachment of claim 10, wherein each of said legs of each of said side frames has elongate upper and lower portions, the upper portion of the leg being telescopically extendible, the lower portion of the leg being pivotally coupled to said upper portion of the leg.

15. The attachment of claim 10, wherein each of said cross bars of said side frames has a length, wherein said sides of said canopy each have a length, wherein said length of each side of said canopy is generally parallel with the length of the cross bar of the associated side frame.

16. The attachment of claim 10, wherein one of said ends of said canopy is positioned adjacent one of said ends of each of said cross bars of said side frames, wherein another of said ends of said canopy is positioned adjacent another of said ends of each of said cross bars of said side frames.

17. The attachment of claim 10, wherein each of said sides of said canopy are looped around the cross bar of the associated side frame to attach the cross bar to the associated side of said canopy, wherein a plurality of fasteners detachably attach each of said sides of said canopy looped around the cross bar of the associated side frame to an adjacent portion of said canopy.

* * * * *